United States Patent [19]

Furtney, Jr.

[11] 3,878,473

[45] Apr. 15, 1975

[54] DIGITAL PHASE-LOCKED LOOP GENERATING SIGNED PHASE VALUES AT ZERO CROSSINGS

[75] Inventor: Ralph W. Furtney, Jr., Boulder, Colo.

[73] Assignee: International Business Machines Corporation, Armonk, N.Y.

[22] Filed: June 17, 1974

[21] Appl. No.: 480,073

[52] U.S. Cl. .................. 331/1 A; 328/133; 328/155; 331/25; 331/34

[51] Int. Cl. ............................................. H03b 3/04

[58] Field of Search ........ 331/1 A, 25, 34; 328/133, 328/134, 155

[56] References Cited

UNITED STATES PATENTS

| | | | |
|---|---|---|---|
| 3,557,308 | 1/1971 | Alexander | 328/155 X |
| 3,602,834 | 8/1971 | McAuliffe | 331/1 A |
| 3,646,452 | 2/1972 | Horowitz et al. | 328/133 X |
| 3,731,220 | 5/1973 | Besenfelder | 331/25 X |

*Primary Examiner*—Siegfried H. Grimm
*Attorney, Agent, or Firm*—Herbert F. Somermeyer

[57] ABSTRACT

Digital signal processing techniques are employed to construct a digital phase-locked loop (PLL). The PLL of the present invention is advantageously employed in a readback circuit for a digital signal magnetic recorder. A unique phase error detector stores at least three digital values representative of three successive samples of a periodic waveform to which the PLL is to be synchronized. Upon detection in a change of sign of the digital values, a transition is indicated. One of the three numbers, preferably the center one, is transferred to a PLL digital filter wherein the successive values are averaged and scaled for controlling a digital VFO, also referred to as an NCO (numerically controlled oscillator). The digital VFO has a pair of counters which count down to zero, then emit a transition generating a clock signal for synchronously operating the sampler and other circuits in the readback apparatus.

11 Claims, 12 Drawing Figures

DIGITAL PHASE-LOCKED LOOP GENERATING SIGNED PHASE VALUES AT ZERO CROSSINGS

BACKGROUND OF THE INVENTION

The present invention relates to phase-locked loops, and particularly to a phase-locked loop which employs a unique phase error detector and employs digital signal processing techniques for generating the phasing and clocking operations.

PLL's have been used for several years in the self-clocked, magnetic, digital, signal recorder. Such phase-locked loops offer many inherent advantages such as stability of operation, adaptiveness to various environmental conditions, and high degrees of phase accuracy. Most prior PLL's used in readback systems for digital signal magnetic recorders have been so-called "analog" types. It is well known that digital signal processing techniques can replace analog circuits. This is particularly true with the advent of large-scale integration and of charge-coupled devices, such as shown in the article by Gilbert F. Amelio, "Charge-Coupled Devices," SCIENTIFIC AMERICAN, February 1974, Volume 230, Number 2, Pages 22–31. Exemplary digital processing techniques are set forth in the IEEE Press Book, DIGITAL SIGNAL PROCESSING, as edited by L. Rabiner and C. M. Rader, The Institute of Electrical and Electronic Engineers, New York, 1972, Library of Congress Card No. 72-90358.

Such phase-locked loops should have noise rejection and operate with a minimum number of samples per bit, for example, two to three samples per bit.

SUMMARY OF THE INVENTION

In accordance with the present invention, a digital data phase-locked loop includes sampling means for sampling data at zero crossovers, and at least once between two successive crossovers to generate a digital number representative of the amplitude at each sample. A transition is detected by comparing at least three digital numbers representing three successive sampled amplitudes. A change of sign between two of the numbers indicates a transition or zero crossover. One of the numbers in the set of three is transferred as indicating phase error, e.g., represents the amplitude of the zero crossover. If the phase-locked loop is in phase, the number should be zero or some other reference number. Deviation from such reference indicates an error. A digital filter receives the phase error number and adjusts it for loop gain generating a VFO controlling digital number. A digital VFO responds to the controlling number to generate an in-phase clock signal.

In another aspect of the invention, a transition detector advantageously employed with the above-described phase-locked loop employs threshold detectors for detecting that a zero crossover is bounded by at least two digital numbers exceeding a given threshold for ensuring against erroneous or false zero crossover indications. The center one of the three samples represents the signal amplitude at the zero crossover. A change of sign of the adjacent two numbers gates the center value to the digital VFO. Preferably, the digital VFO consists of two counters, one for counting the bit period and the other counting for one-half a bit period. The counters are preferably of the count-down type which emit a transition or change in state signal when zero is reached. The VFO controlling number is adjusted in accordance with the phase error numbers received from the transition detector.

The foregoing and other ojbects, features, and advantages of the invention will become apparent from the following more particular description of the preferred embodiment, as illustrated in the accompanying drawing.

THE DRAWING

DETAILED DESCRIPTION

Figure 1:
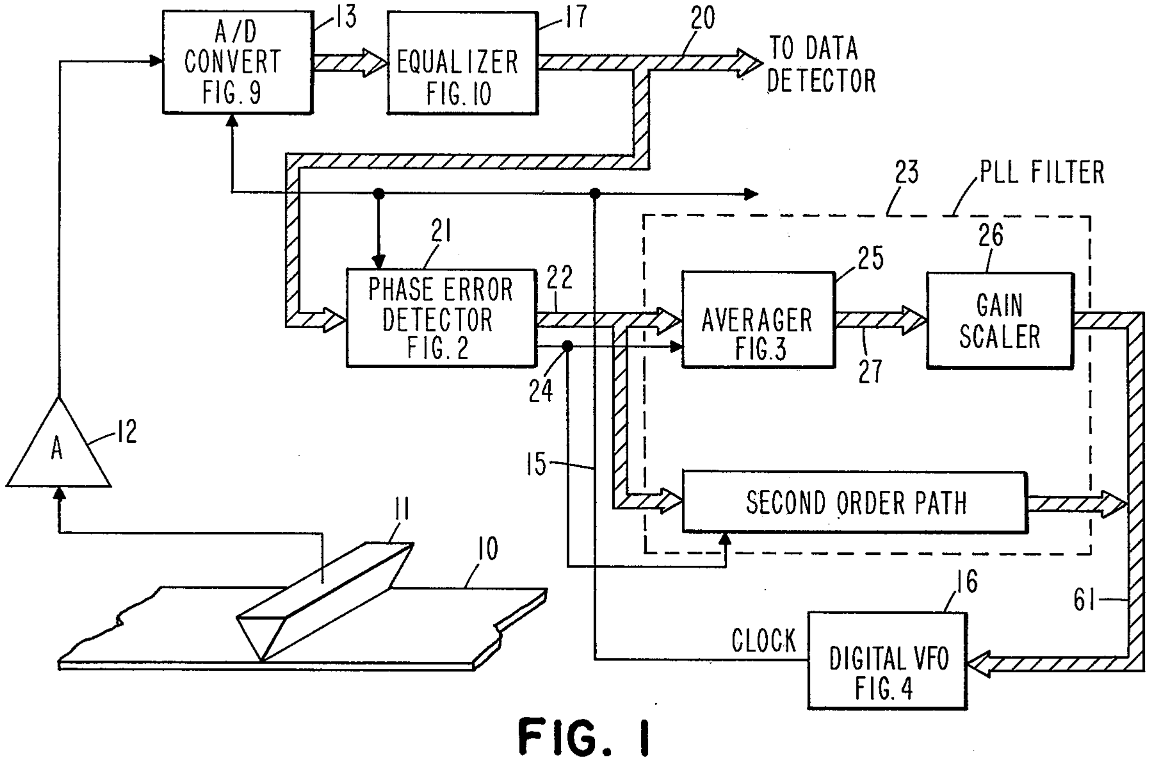
FIG. 1 is a block signal flow diagram of apparatus employing the present invention.

An advantageous application of the phase-locked loop (PLL) of the present invention is in a readback apparatus for magnetic medium 10. A readback transducer 11 supplies analog readback signals through preamplifier 12 to A-to-D converter 13. A-to-D converter 13 also includes a sample and hold circuit, as described later with respect to FIG. 9. The sample times are determined by a clock signal 14 (FIG. 8) supplied over line 15 from digital VFO or NCO 16 as described later with respect to FIG. 4. The digitized signals are preferably digitized to four bits, plus sign, and supplied to equalizer 17. Equalizer 17 is constructed using known digital signal processing techniques. The equalized output is a set of digital signals representing equalized readback signals and is supplied over cable 20 to a data detector (not shown) for use in synchronously detecting data signals from the readback signal. Additionally, the equalized set of digital signals is supplied to phase error detector 21 to compare the phase of the clock signal with the phase of the readback signal. If the clock and readbback signals are in phase, then the number quantized at the zero crossover should be at a reference number or be all 0's. In the illustrated embodiment, an all-0's reference number has been chosen. The phase error detector 21 supplies the phase error as a set of four digital signals over cable 22 to PLL filter 23. The fact that a transition occurred is indicated by a pulse (FIG. 8, transitions) supplied over line 24 to PLL filter 23. Filter 23 consists of two parts —an averager, as described later with respect to FIG. 3, and a gain scaler 26. Averager 25 reduces the effect of noise and data-pattern induced perturbations in the zero-crossing locations. Gain scaler 26 adjusts the loop gain for stabilizing phase-locked loop operation and is described later with respect to FIGS. 3 and 5. The illustrated phase-locked loop can also be made a second order loop as opposed to the illustrated first order loop by adding the circuits illustrated in FIG. 5 in parallel with PLL filter 23.

Figure 2:
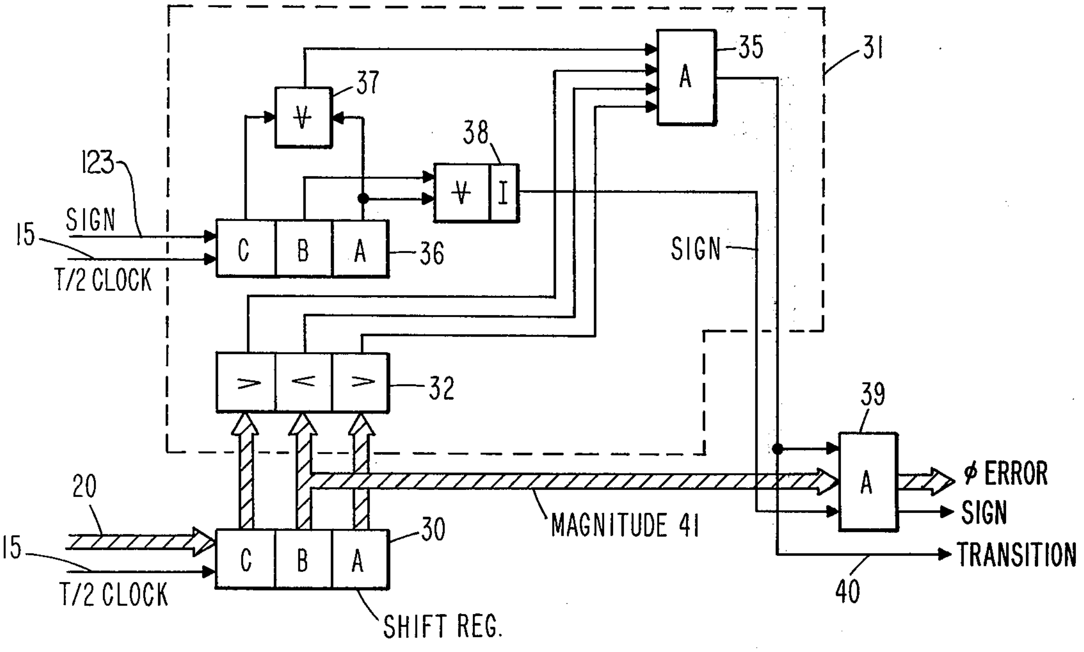
FIG. 2 is a block signal flow diagram of a phase error detector usable with the FIG. 1 illustrated apparatus and particularly shows an inventive transition detector.
Figure 2A:
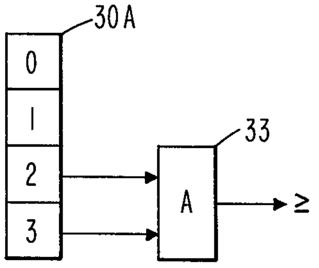
FIGS. 2A and 2B illustrate threshold detectors for the FIG. 2 illustrated phase error detector.
Figure 2B:
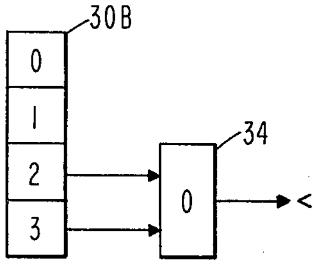

A transition detector constructed in accordance with the present invention is shown in FIG. 2, along with circuitry for supplying phase error or phase difference values at each detected transition. The four-bit digital magnitude values from equalizer 17 are supplied synchronously by the T/2 clock on line 15 to three-stage, four-bit wide, shift register 30. Each of the four bits in the respective stages A, B, and C are supplied to transition detector 31. A first set of threshold detectors 32 responds to the four-bit digital values to indicate that the number in A stage is greater than a predetermined threshold, in the B stage is less than a predetermined threshold and in the C stage is greater than the first-mentioned predetermined threshold. The greater-than threshold detector is shown in FIG. 2A wherein the four-bit stage 0–3 register 30A has the most two significant digit positions 2 and 3 supplying binary 1 signals to AND circuit 33. If both stages 2 and 3 contain binary 1's, the number in stage 30A is greater than or equal to the decimal number 12. In a similar manner, in FIG. 2B, the four-bit stage register 30B applies the 0-indicating signals from stages 2 and 3 to OR circuit 34 indicating that the number in stage 30B is less than decimal 12. The output signals from the threshold detectors 32 are supplied in parallel to AND circuit 35. These three signals from the threshold detectors indicate that a zero crossing may have occurred.

Figure 8:
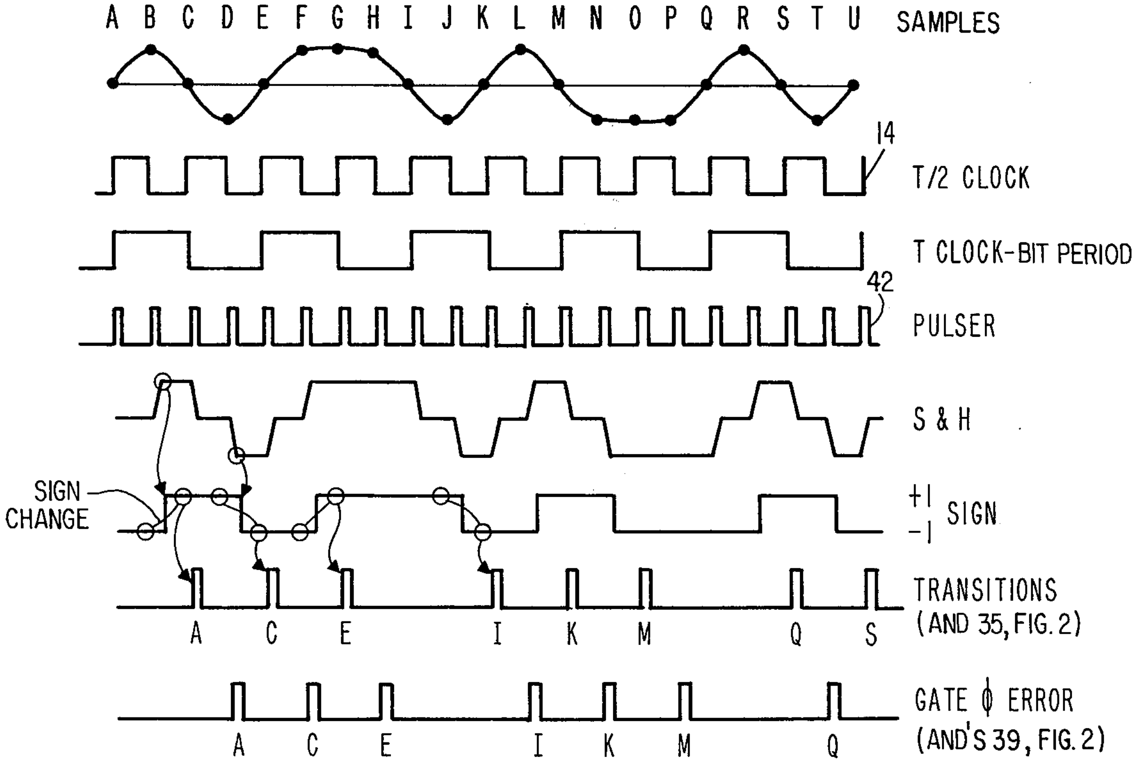
FIG. 8 is a graphical representation of signals usable to illustrate the operation of the FIG. 1 illustrated apparatus.

There may be a false zero crossing indication when stages 30A and 30C contain two peaks of a readback signal, while center stage 30B contains a number representing a signal perturbation within the readback signal rather than the true zero crossing. To ensure there is a true zero crossing, the sign of the digital values, i.e., one or 0 for + and −, respectively, as generated by A-to-D converter 13 and supplied through equalizer 17 is synchronously set into a three-stage single bit wide shift register 36. T/2 clock on line 15 shifts the sign bits through register 36 at the same time the corresponding four-bit magnitudes supplied over cable 20 are shifted through register 30. A sign change between the first received sign bit at stage 36A and the last of the three sign bits in 36C are detected by EXCLUSIVE OR circuit 37 (FIG. 8, sign, signal shows sign changes). That is, if 36A contains a 1 and 36C contains a 0, there has been a sign change resulting in an active output signal supplied to AND 35 from EXCLUSIVE OR 37.

To ensure that the transition sample is accompanied by the proper sign, EXCLUSIVE OR circuit 38 samples the signal states of stages 36A and 36B to invert the sign of 36B for negative going transitions. AND's 39 pass the stored signal values of stage 30B as received over cable 41 and proper sign as received from circuit 38 whenever AND 35 supplies its signal gate phase error (FIG. 8). There are several safeguards in indicating a phase error; i.e., there must be a change in sign at a predetermined location as indicated by the active output signal of EXCLUSIVE OR 37 plus the digitized values of the readback signal must have changed a predetermined amount as determined by the settings of threshold detectors 32. Since the center stage 30B contains the quantized amplitude of the zero axis crossing, any nonzero value in stage 30B represents a phase error as explained with respect to FIG. 7.

Figure 7:
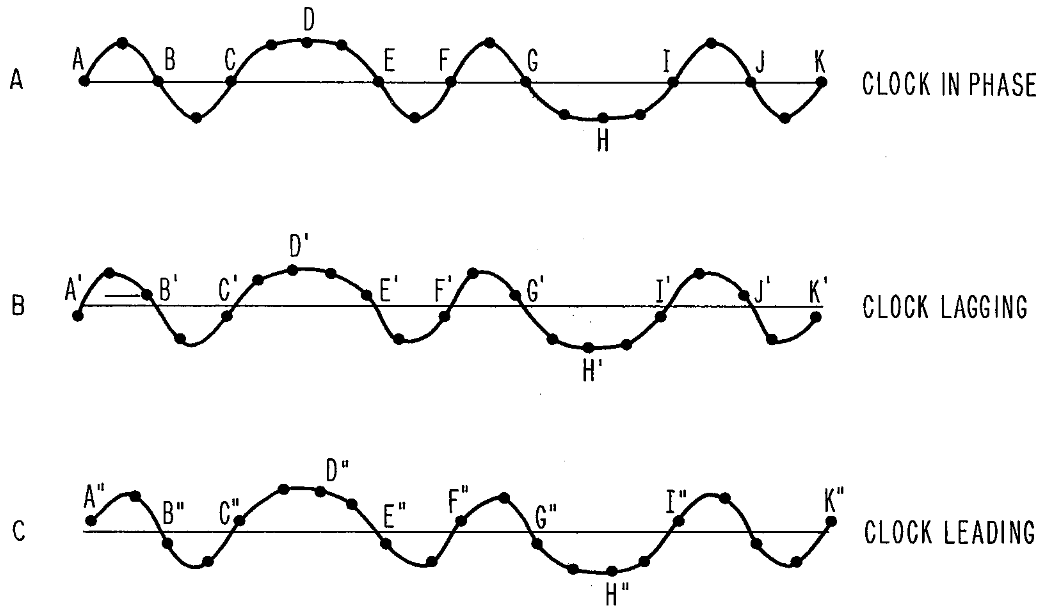
FIG. 7 is a set of waveforms showing sample times for an in-phase, lagging phase, and leading phase clock for use in illustrating the operation of the FIG. 1 apparatus.

In FIG. 7, waveform A shows sample times represented by the small circles where the clock is exactly in phase with the received signal. The samples at the zero crossovers A, B, C, E, F, G, I, J, and K are all 0. Note the 0 can have either a plus or minus sign. If the clock is lagging, then the zero crossover samplings have a value B′ at a negative crossing and a negative value at C′ for a positive crossing. The same is true for the zero crossings at E′, G′, F′, I′, J′, and K′. In a similar manner, when the clock is leading as shown in waveform C, the positive-going crossings as at A″, C″, F″, I″, and K″ have a small positive value; while the negative-going crossings have a small negative value such as at B″, E″, G″, and J″. In waveform B, with the clock lagging, the small values at the displaced zero crossovers are subtracted from the numerical values presently controlling the clock to thereby phase shift the clock signal such that it will attempt to catch the data zero crossovers. The reverse is true in the situation when the clock is leading, wherein the number controlling the digital VFO is increased thereby shifting the clock phase toward alignment with data phase. The same sampling technique is used for the FIG. 8 signal with alternate A, C, E, etc., characters indicating possible zero crossover times. The other FIG. 8 signals are discussed elsewhere.

For example, if there is a one megabyte per second data rate and a 100 megahertz oscillator, there are 100 oscillator cycles per nominal bit period. If there is a ±1 volt input waveform and four phase error estimates are desired before making a clock phase correction (for clock stability purposes), the accumulator or averager 25 (FIG. 1) will then average the last four samples to supply a numerical value through the gain scaler 26 to control digital VFO 16. For example, if the last four numerals from the phase error detectors 21 are +0.2, +0.3, −0.1, and +0.4 wherein + is a phase lead, the resultant accumulated value will be +0.8. Dividing this by four yields a phase error of leading +0.2. Assume that the linear gain of the bit period correction per volt of error signal is 20%; then gain scaler 26 would supply an output signal for controlling the digital VFO of 100 (nominal bit period count) minus 0.2 × 20, or 96. This yields a faster clock which moves the sample points toward the zero crossing. After this correction of the VFO, succeeding sample intervals are always of the nominal length 100 until there is a net nonzero phase error estimates based upon four successive readings. Maximum correction can be limited to about 25% of a bit period.

As is common with first-order phase-locked loops, the illustrated PLL is sensitive to a constant frequency offset betwen the PLL design frequency and the actual data frequency. To compensate for such an offset, a second-order phase-locked loop is employed, as will be described later.

Figure 3:
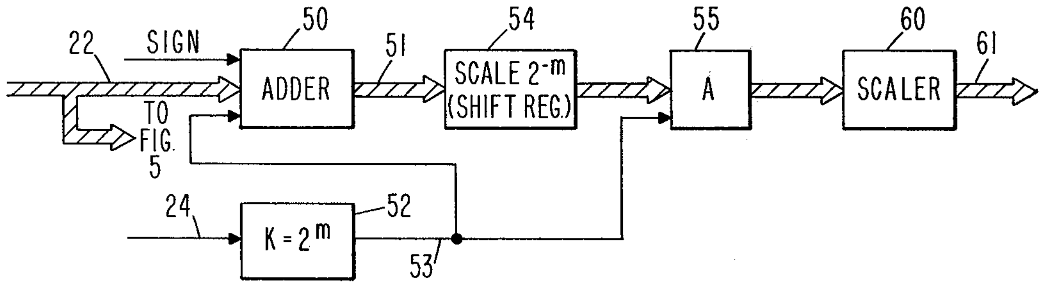
FIG. 3 is a block signal flow diagram of a cyclic averaging filter employable with the FIG. 1 illustrated apparatus.

Referring to FIG. 3, averager 25 is described. Successive digital sets of phase errors received over cable 22 are supplied to adder 50 which can accumulate four phase error readings and provide a sum of the four phase error readings over cable 51. The transition indicating signal over line 24 is counted in counter $K = 2^M$, where M equals 2 for a four sample averager. When K = 4, counter 52 supplies an actuating signal over line 53 to cause adder 50 to read out the total sum of the four samples to divider 54, which is a scale $2^{-M}$ shift register. The adder output may be wired to effect a $2^{-M}$ shift. The average value stored in shift register 54 is simultaneously read out through AND circuits 55 for making the above-described correction. The above operation is repeated every four zero crossings for generating phase error corrections every fourth zero axis crossing. For example, if there is a zero axis crossing at A, then zero axis crossing F is the next time the clock is corrected in phase.

Figure 5:
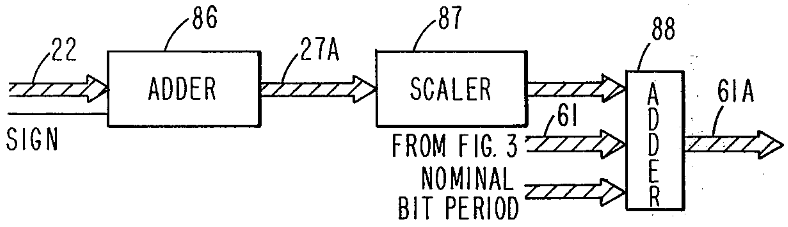
FIG. 5 shows a free-running adder, gain scaler, and summer usable with the PLL filter shown in FIG. 1 to make it a second order PLL.

For enhancement of the described apparatus, a second-order phase-locked loop, such as shown in FIG. 5, can be added to the FIG. 1 illustrated apparatus. The second-order path of FIG. 5 is added in parallel to PLL filter 23 of FIG. 1 using the below-described considerations. In designing a second-order loop in a digital signal processed phase-locked loop, clock implementations and problems have to be carefully considered. At a data rate of one million bits per second, achieving a 1% accurate adjustment of the digital VFO frequency, requires a counter capable of counting 100 million pulses per second. To reduce the problem of constructing such a counter, the clock frequency could be reduced to, for example, 50 million pulses per second yielding a 2% accuracy adjustment resolution. If the magnetic medium velocity control is better than 1% regulation, then a 2% change in digital VFO frequencies is too coarse. In such a case, one merely periodically corrects phase alignment rather than introduce any frequency adjustments, and the first-order loop shown in FIG. 1 is satisfactory. If the magnetic medium is to be interchanged, then velocity control tolerances can result in high average phase errors in a first order loop. In such a situation, second-order phase-locked loops become more interesting.

To obtain the second order loop, one merely adds an accumulator that is not cleared after every VFO phase correction to yield a signal proportional to the approximate integral of the phase error. In the proportional path, there is a phase correction count related to the proportional error signal. This can be limited to a fraction of a bit period, for example, not greater than 25% and is applied only once. In the integral path, the count corresponds to the integral of the phase error. The latter is applied continuously until the integral signal causes it to change. By combining the teachings of FIGS. 3 and 5, the proportional path of FIG. 3 supplies its output in parallel with the output of the FIG. 5 integral path to adder 88. Adder 86 is an accumulating type of adder which is not cleared after each phase correction or bit period. It, therefore, contains the approximate integral of the phase error. This integral is then supplied to the gain scaler 87.

The output of the integral path gain scaler 87 and the output of the proportional path gain scaler 60 (whose output is zero except at the end of the averaging intervals) are combined in adder 88 with a count representing the nominal bit period. With this implementation, gain scalers 60, 87 accomplish multiplication of a variable by the constant and can be realized by a number of known techniques. Alternatively the gain scalers 60, 87 can be realized by the circuit of FIG. 6. The advantages of using the latter implementation are that the separate summation of the nominal bit period count can be avoided, non-linear loop gain constants can be easily employed, and the implementation may be less expensive than conventional multiplication circuits.

Figure 6:
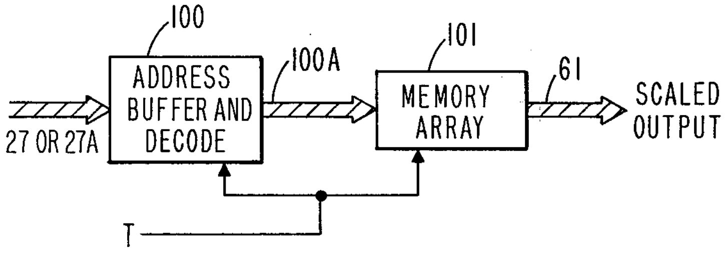
FIG. 6 is a block diagram of a table look-up type digital gain scaler.

Referring to FIG. 6, consider first the case where the circuit implements the first order loop gain scaler 60. Address buffer 100 holds the current phase error estimate, if at the end of the averaging interval, or zero otherwise. The phase error estimate (or zero) serves as the address to a memory array (ROM) at which address a number is stored that reflects the nominal bit period count plus a scaled phase correction count unique to that address and therefore unique to the input phase error estimate corresponding to +0.2 as per the earlier example. As before, assuming a linear gain of 20% of a bit period per volt of error, the corrected bit period count is 96. Then the phase error estimate is represented as 10011 and addresses a memory location wherein would be stored the number 1100000 (96). The address buffer 100 is cleared after readout of the memory array 101 at every clock period T. When 00000 is in the memory buffer 100 the memory array 101 output will be 1100100 corresponding to the nominal bit period of 100 couonts.

The second order loop scaler 60 may be realized either by a circuit which multiplies the digital values by a constant or by the circuit of FIG. 6 wherein a table look-up provides the scaling function. Scaler 87 is mechanized by the circuit of FIG. 6 with the nominal bit period count included in the memory array stored values. Thus, the nominal bit period count plus the scaled phase correction count dictated by the integral path error is summed with the scaled phase correction count dictated by the proportional path error in adder 88. The separate addition of the nominal bit period count, shown in FIG. 5, is not necessary.

The scaling of the first or second order loop is dependent on the control requirements for a specific application. Generally speaking the integration path gain constant will be a factor of ten or so less than the proportional path gain constant. This requires that the integration path accumulator 86 have 4 bits or more greater capacity than the proportional path adder 50. Assuming the ADC uses 4 bits plus sign quantization, and assuming proportional path averaging over M samples; adder 50 should have 4 + M bits plus sign capability, and accumulator 86 should have 8 + M bits plus sign capacity. The divide by $2^M$ in the proportional path and any other required divisions by powers of two can be accomplished by using only the high order bits of adder 50 or accumulator 86 outputs to address the memory arrays.

In addition to the above-described apparatus, the digital filter scaling shown in the IBM TECHNICAL DISCLOSURE BULLETIN, June 1973, Volume 16, Number 1, Pages 235 and 236, can be used with equal facility.

Figure 4:
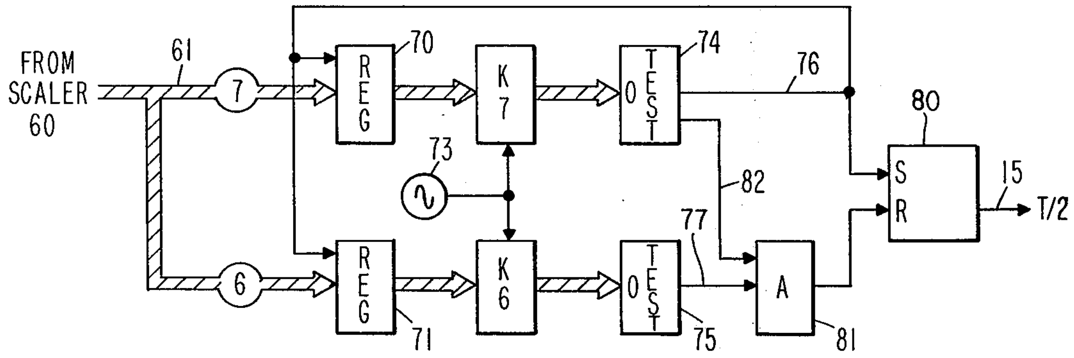
FIG. 4 is a block signal flow diagram of a digital VFO or numerically controlled oscillator (NCO) usable with the FIG. 1 illustrated apparatus.

The numerically controlled oscillator (NCO) or digital VFO (variable frequency oscillator) is shown in FIG. 4. The seven-bit corrected bit period count from scaler 60 or adder 88 travels over cables 61 or 61A to input buffer register 70 for controlling counter K7 to generate full-period signals, as will be described. The six most significant digits of the signals on cable 61 are supplied to register 71 for the half period generator driven by counter K6. A high-frequency oscillator 73 supplies pulses for counting K6 and K7 to zero. When zero is reached, a half period and a full period are, respectively, indicated. To this end, the zero test circuits 74 and 75 respond to the signal contents, respectively, of counters K7 and K6. When zero is reached, each of the zero test circuits supply a zero-indicating signal, respectively, over lines 76 and 77. The signal on line 76 signifying the end of a bit period gates the signals supplied over cables 61 or 61A, respectively, into registers 70 and 71. These registers have internal gating circuits (not shown) constructed using known techniques. The insertion of the numbers in registers 70 and 71 restarts the timing of a bit period.

The FIG. 4 illustrated apparatus generates the T/2 clock signal on line 15 in the following manner. Clock flip-flop 80 is set to the active condition by the line 76 pulse. Flip-flop 80, being in the set state, signifies that the first half of a bit period is occurring. The middle of the bit period, determined by the output of zero test circuit 75 signal on line 77, is gated to reset flip-flop 80 via AND circuit 81. The AND circuit is enabled to pass the half bit period signal any time zero test circuit 74 signifies that the count in K7 is not near zero. A signal on line 82 connected to the third through seventh digit positions of K7 via an OR circuit can be used to enable AND 81. The flip-flop 80 being reset signifies the second half of the bit period. Hence, the signal on line 15 is the T/2 clock shown in FIG. 8.

Figure 9:
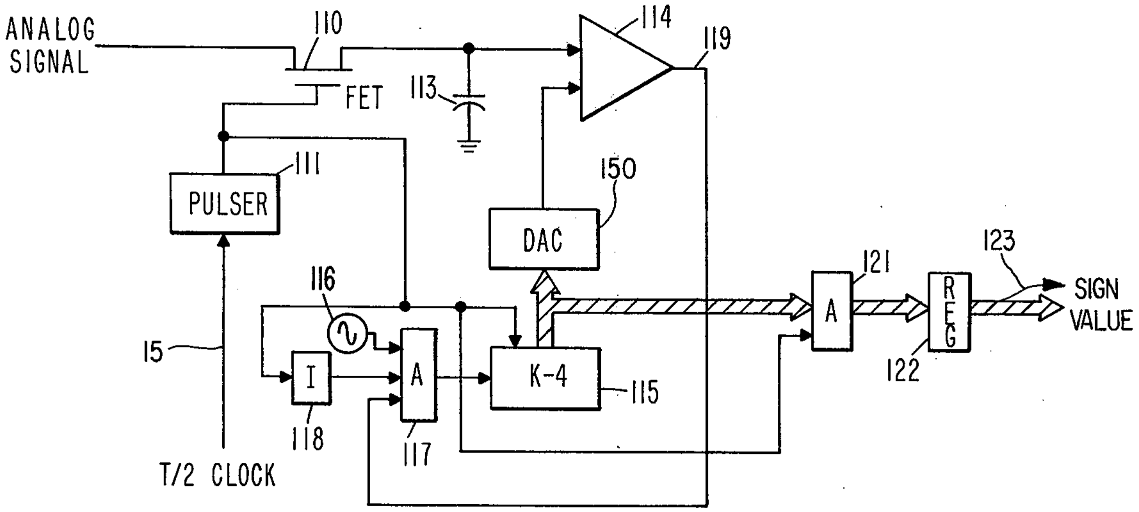
FIG. 9 is a signal flow diagram of a sample and hold with an A-to-D converter usable with the present invention.

Sample and hold circuit portion of A-to-D converter 13 is shown in FIG. 9. The readback signal from preamplifier 12 is gated through FET (field effect transistor) 110 by pulser 111 in response to a transition of the T/2 clock shown in FIG. 8. The pulser 111 output signals 42 (FIG. 8) open FET 110 for passing the readback signal amplitude a very short period of time. The passed readback signal amplitude is stored in capacitor 113 and held therein after FET 110 is made current nonconductive (signal S and H of FIG. 8). Differential amplifier 114 has a high input impedance for maintaining the stored charge in capacitor 113 for at least ½ a bit period. In the illustration, analog-to-digital converter (ADC) 13 is intimately associated with the sample and hold circuit.

ADC 13 generates a digital value in four-stage counter 115 which is driven by a high-frequency oscillator 116 through AND circuit 117. AND 117 is enabled to pass oscillator 116 pulses whenever pulser 111 is not supplying a sampling pulse 42 to FET 110, as indicated by inverter circuit 118. Additionally, differential amplifier 114 supplying a not-null signal over line 119 completes AND circuit 117 enablement. Counter 115 counts at oscillator 116 rates until the output signal from DAC 150 substantially equals the stored signal amplitude of capacitor 113. At this time, amplifier 114 supplies a null signal disabling AND 117 and stopping the counting of counter 115. The numerical values stored in counter 115 now accurately represent, to a four-digit quantization, the signal amplitude stored in capacitor 113. This conversion takes a very short period. Counter 115 maintains the count until the end of the sample time. AND's 121 pass the signal contents of four-stage counter 115 to register 122, on output register of A-to-D 13. The output of register 122 constitutes a first set of four digital signals representative of the signal amplitude contained in capacitor 113. This is an absolute magnitude. The generation of the sign (polarity) signal (FIG. 8) is separately determined based on input signal polarity.

In digital signal magnetic recorders, particularly at the higher recording densities, intersymbol interference (ISI) causes perturbations in the signal. Equalization can compensate for such interference. Such ISI is often referred to as "peak shift", "pulse crowding", etc. The equalization can be made adaptive to various signal parameters by sensing such parameters or using a priori knowledge of the characteristics of the readback channel, such as medium velocity with respect to the transducer, etc.

For a readback channel having a 17 DB output signal-to-noise ratio and a data rate of about $10^6$ bits per second, sampling at 2.5 samples per bit period with a four-bit bipolar ADC, a digital signal equalizer designed in the Z domain was selected for digital signal equalization. In designing a digital signal equalizer based upon an analog circuit design, it is preferred that the bilinear transformation be employed. Such bilinear transformation tends to reduce aliasing. This is accomplished by a conformal mapping from the S domain to the Z domain. In effect, the bilinear Z transform makes continuous and discrete frequency transfer functions substantially identical. For equalization, the equation to be solved by the digital signal processing circuit 17 is:

$$Q(Z) = T_S/2 + K_{aa}(1+Z/1+B_{a1}Z) +$$
$$(K_{bb})(1+Z)/(1+B_{b1}Z) +$$
$$K_{cc}(1+A_{c1}Z+A_{c2}Z^2)(1+B_{c1}Z+B_{c2}Z^2)$$

In the above equation, the Z transform is defined in positive powers of Z. The K's, A's and B's are constants; and $T_S$ is the sampling period. Typical values for multiplying constants for the above tansform equation are set forth below in Table I.

TABLE I

| | Sampling Period $T_S$ | | |
|---|---|---|---|
| Constants | $10^{-6}$ Sec. | $5 \times 10^{-7}$ Sec. | $10^{-7}$ Sec. |
| ½ $T_S$ | $0.5 \times 10^{-6}$ | $0.25 \times 10^{-6}$ | $0.5 \times 10^{-7}$ |
| $K_{aa}$ | −0.0920 | −0.0454 | −0.0090 |
| $K_{bb}$ | 0.0084 | −0.0025 | −0.0112 |
| $K_{cc}$ | 2.0375 | 0.7914 | 1.5929 |
| $K_{cc} \times A_{c1}$ | 0.0741 | −0.3147 | −0.6299 |
| $K_{cc} \times A_{c2}$ | −1.9634 | −2.1061 | −2.2228 |
| $B_{a1}$ | −0.9969 | −0.9984 | −0.9997 |
| $B_{b1}$ | −0.7986 | −0.7986 | −0.7986 |
| $B_{c1}$ | −0.0642 | −0.0642 | −0.0642 |
| $B_{c2}$ | 0.6004 | 0.6004 | 0.6004 |

Figure 10:
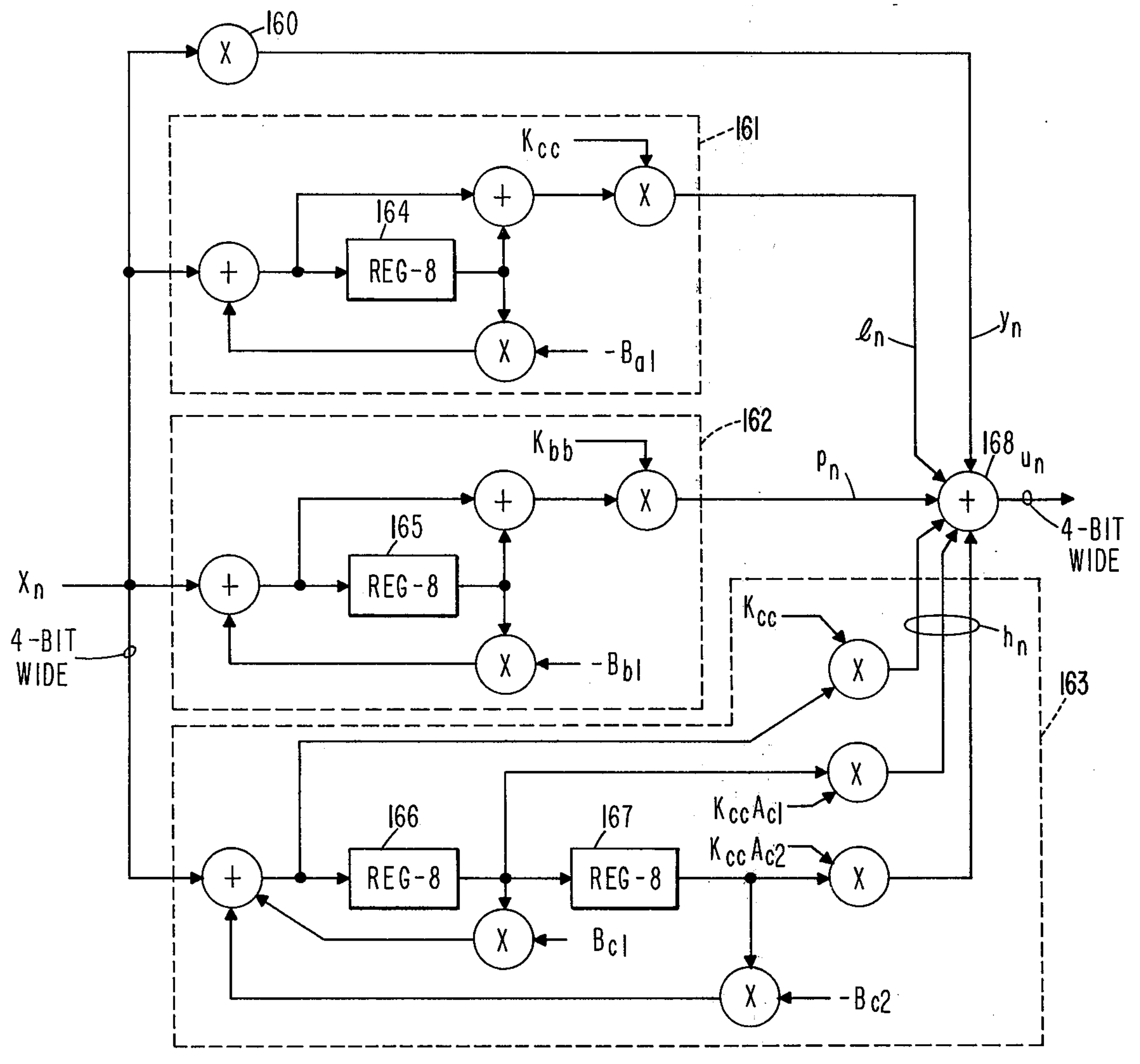
FIG. 10 is a signal flow diagram of a digital signal processing type of equalizer usable with the present invention.

The FIG. 10 illustrated implementation of the digital signal processing equalizer 17 is in accordance with the referenced article from the IEEE Digital Signal Processing book, supra. The leftmost term of the equation is solved by multiplying elements 160, the second term by the elements 161, the third term by elements 162, and the last term by elements 163. Construction of these elements is in accordance with the teachings of the above-referenced article and will not be further explained for that reason. The symbols used in FIG. 10 are those employed in the referenced text book.

A greater degree of accuracy in the illustrated embodiment is required for the B's than for the K's and A's. This relates to the analog equivalent of poles and their location with respect to the unit circle in the Z domain or the right-half plane in the S domain. The above relationship provides a stable equalizing function. For this reason, eight-bit shift registers 164–167 are used in conjunction with the B terms, plus a total of nine 8 × 8 multiplications or 8 × 8 bit and 4 × 4 bit additions are used in the filter for generating the equalization function. The delays between the input to the output are shown in the above Table I. An 8 × 8 bit multiplication, plus storage, requires approximately 100 nanoseconds; while addition takes ten nanoseconds. Other functions also take ten nanoseconds. By adding more multipliers and adders to the illustrated four circuits, processing time can be reduced. For example, two identical equalizers in parallel, each with three multipliers and an adder, such as adder 168, can cut the digital signal processing time in half, for example, from 350 nanoseconds to 175 nanoseconds. Also, by selecting the constants A, B, and K to have more 0's than 1's and employing look-ahead multipliers, equalization digital signal processing time can be further reduced. Implementation of the FIG. 10 illustrated apparatus may be in accordance with the article, "An Approach to the Implementation of Digital Filters," Jackson et al., found on Pages 210–218 of the IEEE Pressbook, supra.

While the invention has been particularly shown and described with reference to a preferred embodiment thereof, it will be understood by those skilled in the art that various changes in form and details may be made therein without departing from the spirit and scope of the invention.

What is claimed is:

1. A digital phase locked loop for operation with apparatus processing a periodic signal having a period T, the improvement including in combination:

timed means quantizing amplitudes and indicating polarity sign of said periodic signal substantially at zero crossings and at midpoints between said zero crossings and supplying a set of amplitude indicating digital signals for each said quantized amplitudes, first shift register means receiving said amplitude indicating digital signals for storing a plurality of said sets of said digital signals, means connected to said quantizing means for receiving sign signals, determining sign changes in said amplitudes and supplying a digital signal indication of said sign change, second shift register means receiving said sign change digital signal synchronously with said first shift register means receipt of said amplitude digital signals, means responsive to said second shift register means for detecting a change of sign and supplying a change of sign digital signal, means responsive to said change of sign change digital signal to gate a certain one of said sets of amplitude indicating digital signals in said first shift register means as a phase error value set of digital signals, means scaling said set of phase error value indicating signals to supply a set of frequency control digital signals, and clock means responsive to said frequency control digital signals to supply clock signals at a successive half periods of T to time said quantizing means.

2. The digital phase locked loop set forth in claim 1 wherein said means determining sign changes includes first, second and third threshold detectors, said first shift register storing first, second and third successively received sets of said amplitude indicating digital signals, each said first and third threshold detectors responsive to said first and third digital signal sets to supply an activating signal, respectively, said second threshold detector responsive to said second digital signal set to supply an activating signal, and means responsive to said activating signals to supply said sign change indicating signal.

3. The digital phase locked loop set forth in claim 2 further including a sign shift register having first, second and third shift stages for holding sign signals respectively corresponding to said first, second and third digital signal sets and received from said quantizing means, a sign difference detector responsive to said first and second sign shift stages to indicate a sign change, and difference means responsive to said first and third sign shift stages to indicate a signal transition.

4. The digital phase locked loop set forth in claim 1 wherein said means determining sign changes includes means coordinated with said first shift register to indicate corresponding signs, and differencing means responsive to said coordinated means to supply a sign change signal.

5. A digital data phase locked loop for operation with an apparatus processing an input periodic signal, the improvement including in combination:

first means sampling the signal amplitude at zero crossovers at least once between two successive crossovers, second means responsive to each of said samples to successively generate digital number signals including sign and representative of the amplitude of such sample, third means storing a plurality of said generated digital number signals, fourth means responsive to said plurality of stored numbers to indicate a zero crossover based upon analysis of said digital number signals, and fifth means responsive to said indicated zero crossover to transfer one of said stored plurality of number signals for each of said sensed crossovers, sixth means responsive to said transferred number to generate a VFO controlling set of digital signals in accordance with a predetermined transfer function, and clock signal generating means responsive to said VFO controlling set of digital signals to generate a timed periodic signal in accordance therewith which relates to the periodically of said input periodic signal.

6. The digital data phase locked loop set forth in claim 5 wherein said plurality of successively generated digital number signals being first, second, and third successive ones of said successively generated digital number signals, said fifth means transferring a second one of said successive ones of generated digital numbers, and said fourth means being responsive to first and second ones of said successive ones of generated digital numbers to indicate a zero crossover.

7. The digital data phase locked loop set forth in claim 6 wherein said fifth means transfers said second one of said generated digital number signals only when said first and second ones of said generated digital number signals have differing sign.

8. The digital data phase-locked loop set forth in claim 6 further including threshold means responsive respectively to said first, second and third digital number signals in said third means to actuate said fifth means only when said threshold means indicate a predetermined value difference between said digital number signals.

9. The phase locked loop set forth in claim 5 wherein said clock generating means includes:

a oscillator operating at a given nominal multiple frequency of said periodic signal, first and second counters, said second counter having twice the number of stable count states as said first counter, first and second register respectively connected to inputs of said first and second counters and each said register receiving said controlling set of digital signals, first and second zero test circuits respectively connected to said counters and respectively responsive to said counters having a predetermined count to emit a pulse; said second test circuit including means supplying a near zero signal, an output latch supplying said timed periodic signal, said second test circuit pulse resetting said first and second registers and setting said output latch, and AND circuit means jointly responsive to said first test circuit pulse and to said second test circuit near zero signal to reset said output latch.

10. A phase error circuit for detecting phase errors based on successive N-bit sets of digital signals representative of signal amplitudes of an input, signal to be tested and upon timed transfer of such digital signals in accordace with timing signals supposedly phase locked with said input signal, the improvement comprising:

an N-bit wide plural stage shift register timed by said timing signals for receiving and shifting successive ones of said N-bit sets of digital signals, a plurality of threshold circuits connected respectively to said stages, first and second ones of said threshold circuits for detecting the N-bit sets of digital signals being greater than given thresholds, a third one of said threshold circuits being connected to a shift stage intermediate said shift stages connected to said first and second threshold circuits and means detecting N-bit sets of digital signals having less than a predetermined threshold, said threshold circuits emitting an indicating signal each time an N-bit set of digital signals exceeding such threshold is detected, and output means responsive to simultaneously emitted indicating signals to transfer said N-bit set of digital signals from said intermediate shift stage as a phase error signal.

11. The phase error circuit set forth in claim 10 wherein said N-bit sets of digital signals further include a sign signal and further including a second shift register timed by said timing signals receiving successive ones of said sign signals, means detecting a change in sign between sign signals corresponding to said N-bit sets of digital signals in said shift stages connected to said first and second threshold circuits, and said output means further responsive to said sign change to transfer only upon coincidental occurrence of a sign change and said simultaneously emitted indicating signal.

* * * * *